United States Patent
Takaishi et al.

(10) Patent No.: US 8,042,009 B2
(45) Date of Patent: Oct. 18, 2011

(54) ELECTRONIC CONTROL DEVICE

(75) Inventors: Naoyuki Takaishi, Kobe (JP); Kazuhiro Komatsu, Kobe (JP); Tomohide Kasame, Kobe (JP); Masanori Akaza, Kobe (JP); Shinichiro Takatomi, Kobe (JP); Kazuhi Yamaguchi, Kobe (JP); Tomoko Satomi, Kobe (JP); Megumi Fukuta, Kobe (JP); Takashi Matsui, Kobe (JP)

(73) Assignee: Fujitsu Ten Limited, Kobe-Shi (JP)

( * ) Notice: Subject to any disclaimer, the term of this patent is extended or adjusted under 35 U.S.C. 154(b) by 439 days.

(21) Appl. No.: 12/000,639

(22) Filed: Dec. 14, 2007

(65) Prior Publication Data

US 2008/0148107 A1  Jun. 19, 2008

(30) Foreign Application Priority Data

Dec. 19, 2006  (JP) ................................. 2006-341980

(51) Int. Cl.
*G06F 11/00* (2006.01)
(52) U.S. Cl. .............. 714/55; 714/47.1; 714/51; 714/48
(58) Field of Classification Search .................... 714/55, 714/37, 47.1, 48, 51
See application file for complete search history.

(56) References Cited

U.S. PATENT DOCUMENTS

| | | | |
|---|---|---|---|
| 5,809,229 A * | 9/1998 | Mori ................................ 714/55 |
| 5,978,939 A | 11/1999 | Mizoguchi et al. |
| 5,982,985 A | 11/1999 | Kawarazaki et al. |
| 6,243,837 B1 | 6/2001 | Zimmermann et al. |
| 6,498,103 B2 * | 12/2002 | Nishio et al. ................... 438/694 |
| 2003/0079163 A1 * | 4/2003 | Hashimoto et al. ............. 714/55 |
| 2007/0050687 A1 * | 3/2007 | Disser et al. .................... 714/55 |
| 2007/0174743 A1 * | 7/2007 | Kuroki ............................ 714/57 |

FOREIGN PATENT DOCUMENTS

| | | |
|---|---|---|
| JP | A-4-205152 | 7/1992 |
| JP | A-10-63544 | 3/1998 |
| JP | A-11-282725 | 10/1999 |
| JP | A-2004-326629 | 11/2004 |

OTHER PUBLICATIONS

"Watchdog Timer in Power-Management System," *IBM Technical Disclosure Bulletin*, vol. 41, No. 01, Jan. 1998, p. 737.

* cited by examiner

*Primary Examiner* — Scott Baderman
*Assistant Examiner* — Sarai Butler
(74) *Attorney, Agent, or Firm* — Oliff & Berridge, PLC

(57) ABSTRACT

An electronic control device according to an embodiment of the present invention includes an arithmetic device such as a microcomputer having a watchdog timer circuit, and a runaway monitoring circuit which monitors the arithmetic device for an operational failure by receiving a pulse output from the arithmetic device, in which the watchdog timer circuit or the runaway monitoring circuit detects occurrence of a failure of the arithmetic device according to the state (high level or low level) of an indication signal (wakeup signal) which shows the operational state of the arithmetic device.

6 Claims, 16 Drawing Sheets

FIG. 7 RUNAWAY PROCESS AFTER INITIALIZATION PROCESS HAS BEEN COMPLETED (AFTER SETTING OF WDT) WHEN BATTERY IS CONNECTED, WHEREBY WAKEUP SIGNAL IS HELD AT LOW LEVEL

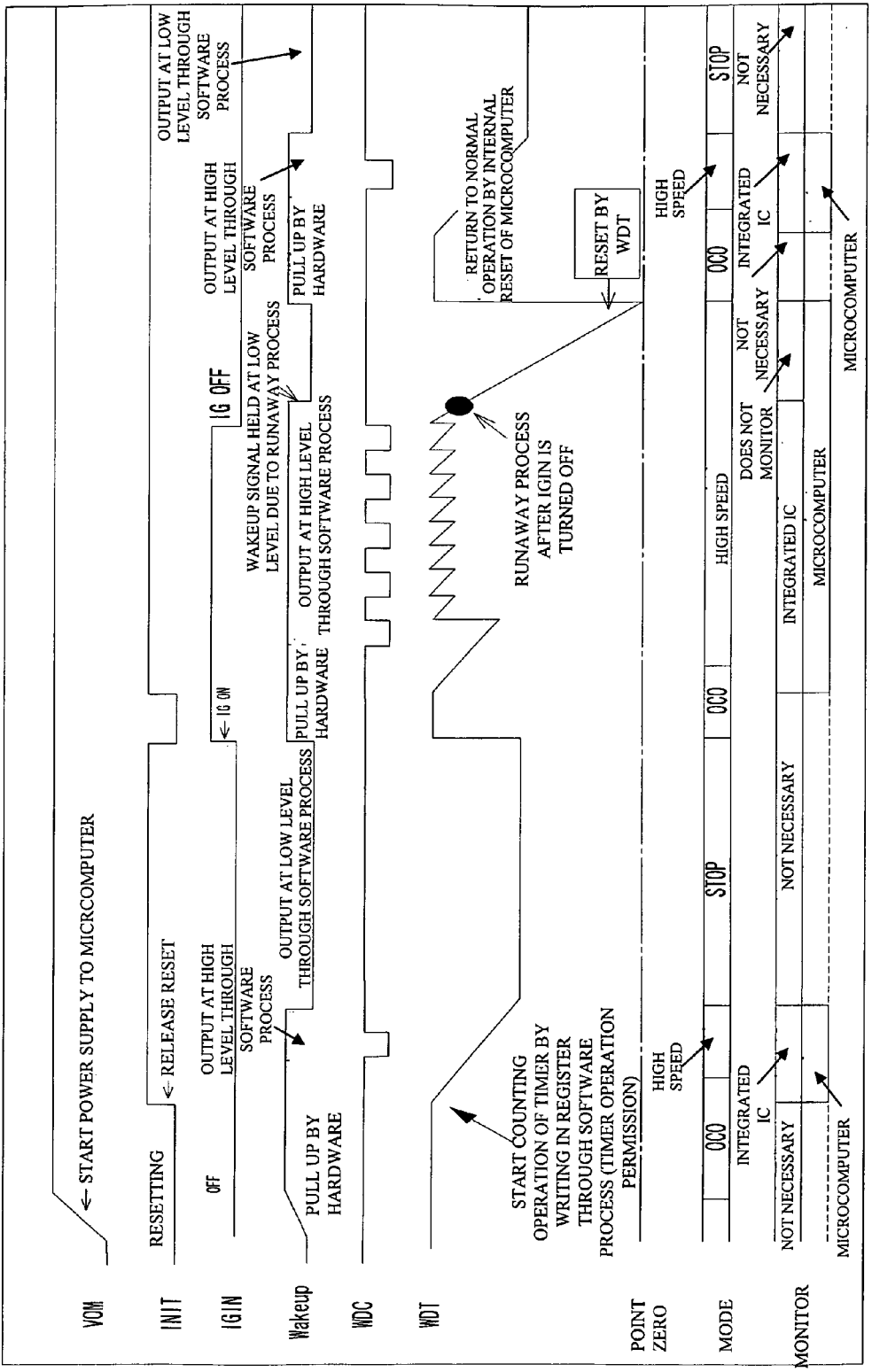

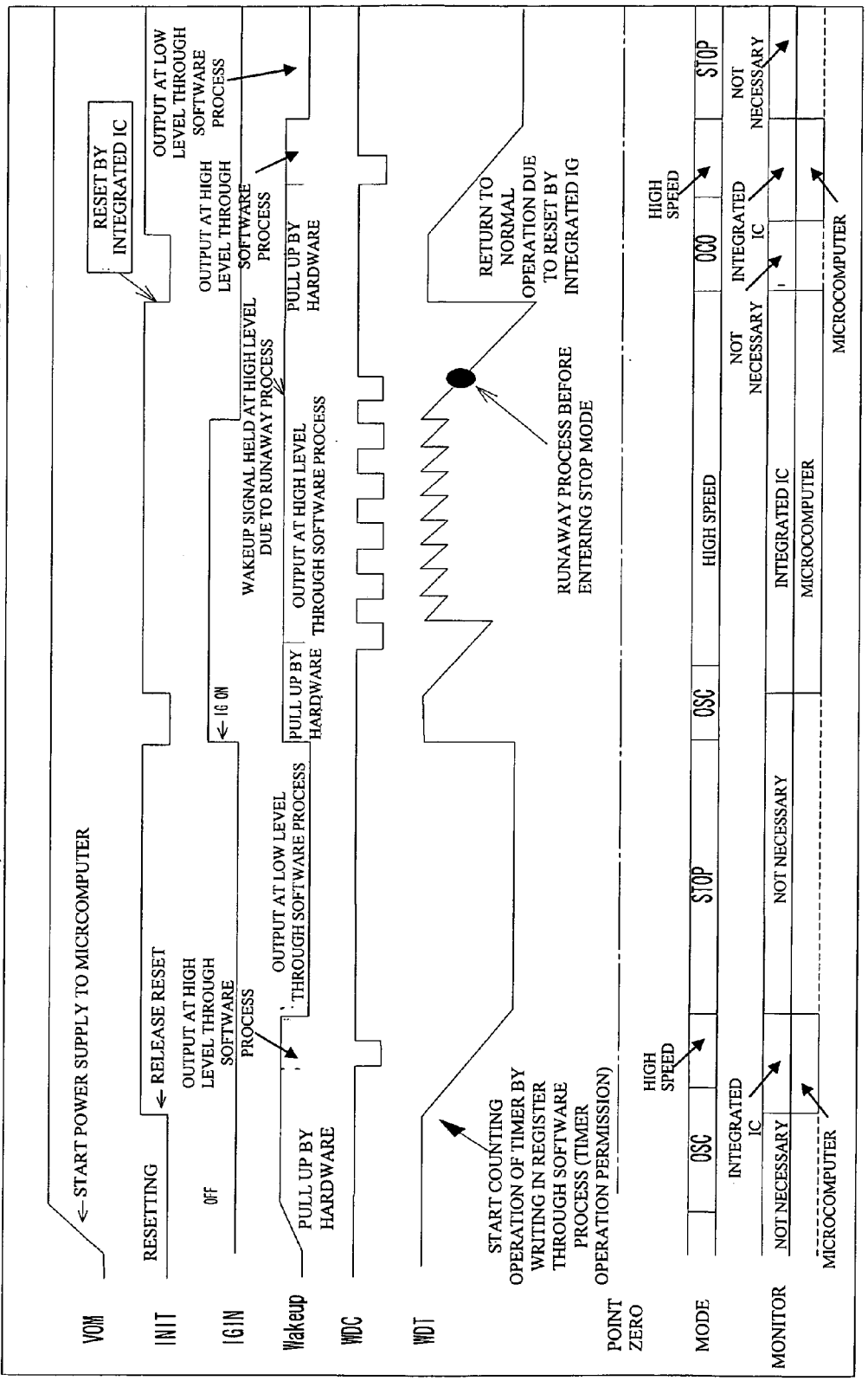

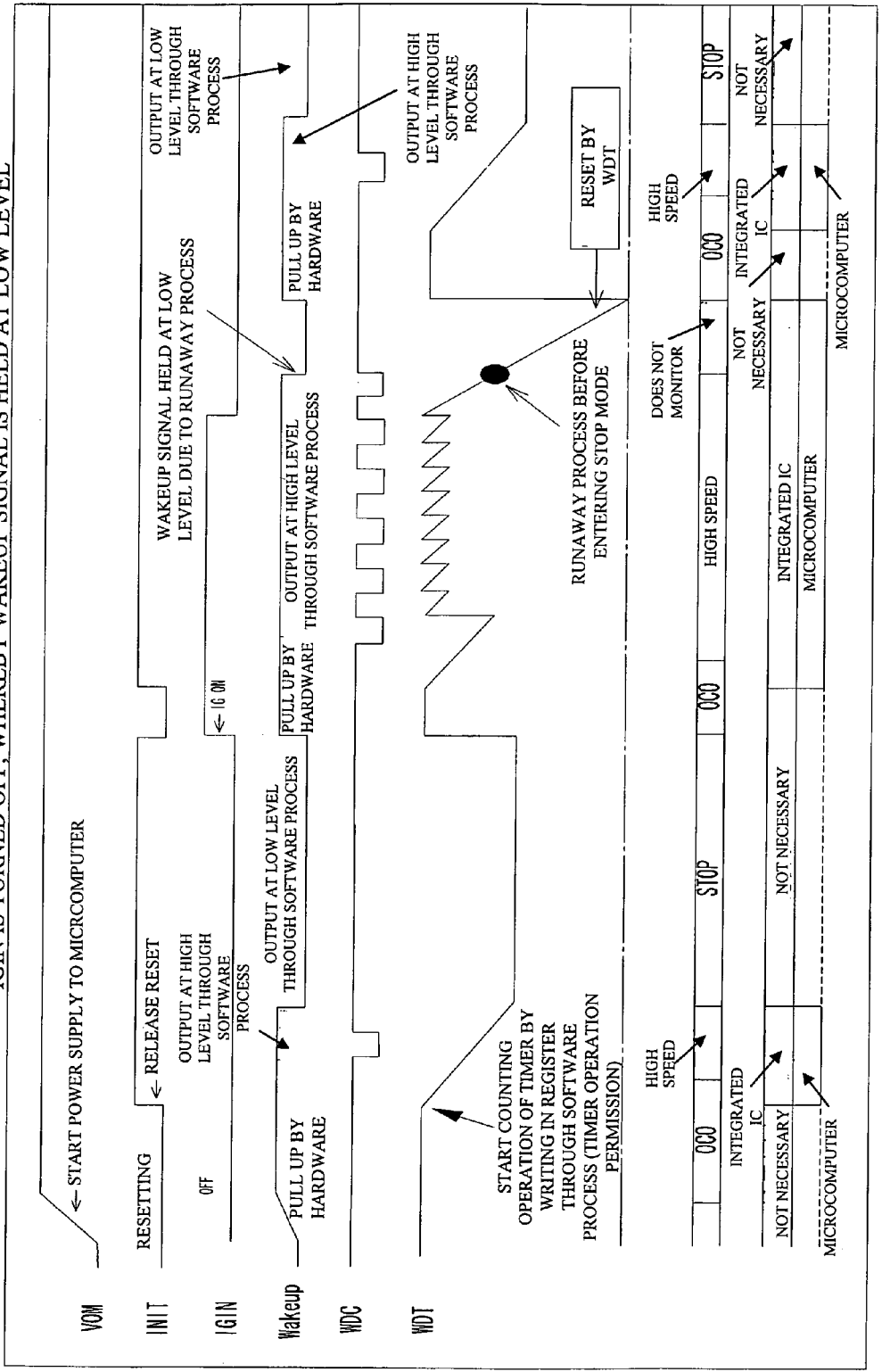
FIG. 16  RUNAWAY PROCESS PREVENTING MICROCOMPUTER FROM ENTERING STOP MODE AFTER IGIN IS TURNED OFF, WHEREBY WAKEUP SIGNAL IS HELD AT LOW LEVEL

ELECTRONIC CONTROL DEVICE

BACKGROUND OF THE INVENTION

1. Field of the Invention

The present invention relates to an electronic control device including an arithmetic device such as a microcomputer having a watchdog timer circuit, and more specifically relates to technology for monitoring a microcomputer for failures.

2. Description of the Related Art

Microcomputers have been designed to have a mode (high-speed mode) in which they operate at high-speed clock during normal operation, and a mode (power-saving mode) in which they operate at a speed lower than the high-speed clock or terminate the operation, in order to reduce power consumption. An example of technology for monitoring such microcomputers for failures is disclosed in Japanese Patent Application Publication No. 2004-326629. The failure monitoring device disclosed in Japanese Patent Application Publication No. 2004-326629 includes a watchdog timer monitoring section which detects a failure during normal operation of the microcomputer, and a stand-by monitoring section which detects a failure during stand-by operation of the microcomputer, both of which are provided external to the microcomputer. Both monitoring sections monitor watchdog pulses output from the microcomputer. During normal operation of the microcomputer, the watchdog pulses are output with a certain periodicity. During a failure, the periodicity is lost. During stand-by operation of the microcomputer, the watchdog pulses are normally not output. However, there may be cases where the watchdog pulses are output during failure. Thus, a failure during normal operation and stand-by operation can be detected by monitoring the watchdog pulses.

However, since the failure monitoring device has a configuration in which two different monitoring sections are provided external to the microcomputer, the size of the device becomes large, resulting in high cost.

SUMMARY OF THE INVENTION

The present invention has been made to solve the above problems, and has an object of providing an electronic control device having a monitoring function which can achieve small size and low cost.

An aspect of the present invention provides an electronic control device including an arithmetic device having a watchdog timer circuit, and a runaway monitoring circuit which monitors the arithmetic device for an operational failure by receiving a pulse output from the arithmetic device, in which the watchdog timer circuit or the runaway monitoring circuit detects occurrence of a failure of the arithmetic device according to a state of an indication signal which shows an operational state of the arithmetic device. Since one runaway monitoring circuit is provided external to the arithmetic device in this configuration, the device can achieve a reduction in size and cost. Since a runaway process of the arithmetic device is detected by the watchdog timer circuit or the runaway monitoring circuit according to the operational state of the arithmetic device, the runaway process can reliably be detected.

The electronic control device may have a configuration in which the operational state of the arithmetic device is generated by the arithmetic device and includes an activated state and a terminated state of the arithmetic device. Since a runaway process of the arithmetic device is detected by the watchdog timer circuit or the runaway monitoring circuit according to the operational state of the arithmetic device, the runaway process can reliably be detected.

The electronic control device may have a configuration further including a circuit which sets a signal line for outputting the indication signal from the arithmetic device at a specific electric potential showing the activated state of the arithmetic device after the power has been supplied, in which the runaway monitoring circuit monitors the arithmetic device for a runaway process when the signal line is at the specific electric potential. Thus, occurrence of a runaway process after the power has been supplied can reliably be detected by the runaway monitoring circuit.

The electronic control device may have a configuration in which the arithmetic device periodically outputs the pulse in the activated state and terminates the output of the pulse in the terminated state. Thus, whether or not the arithmetic device has shifted to the terminated state can reliably be detected.

The electronic control device may have a configuration in which the runaway monitoring circuit includes a timer counter which starts a counting operation each time the timer counter receives the pulse, and a reset output circuit which outputs a reset signal to the arithmetic device when the timer counter is in a specific state. Since the output of the pulse is terminated during a runaway process of the arithmetic device, the runaway process of the arithmetic device can reliably be detected by the runaway monitoring circuit.

The electronic control device may have a configuration further including a signal processing section which performs an external signal exchange, in which the runaway monitoring circuit is provided in the signal processing section.

According to the present invention, an electronic control device having a monitoring function which can achieve small size and low cost can be provided.

BRIEF DESCRIPTION OF THE DRAWINGS

FIG. 14 is a timing chart showing a tenth operational example of the failure monitoring device 30;

FIG. 15 is a timing chart showing an eleventh operational example of the failure monitoring device 30; and FIG. 16 is a timing chart showing a twelfth operational example of the failure monitoring device 30.

DESCRIPTION OF THE PREFERRED EMBODIMENTS

Embodiments of the present invention are described below with reference to the drawings.

Figure 1:
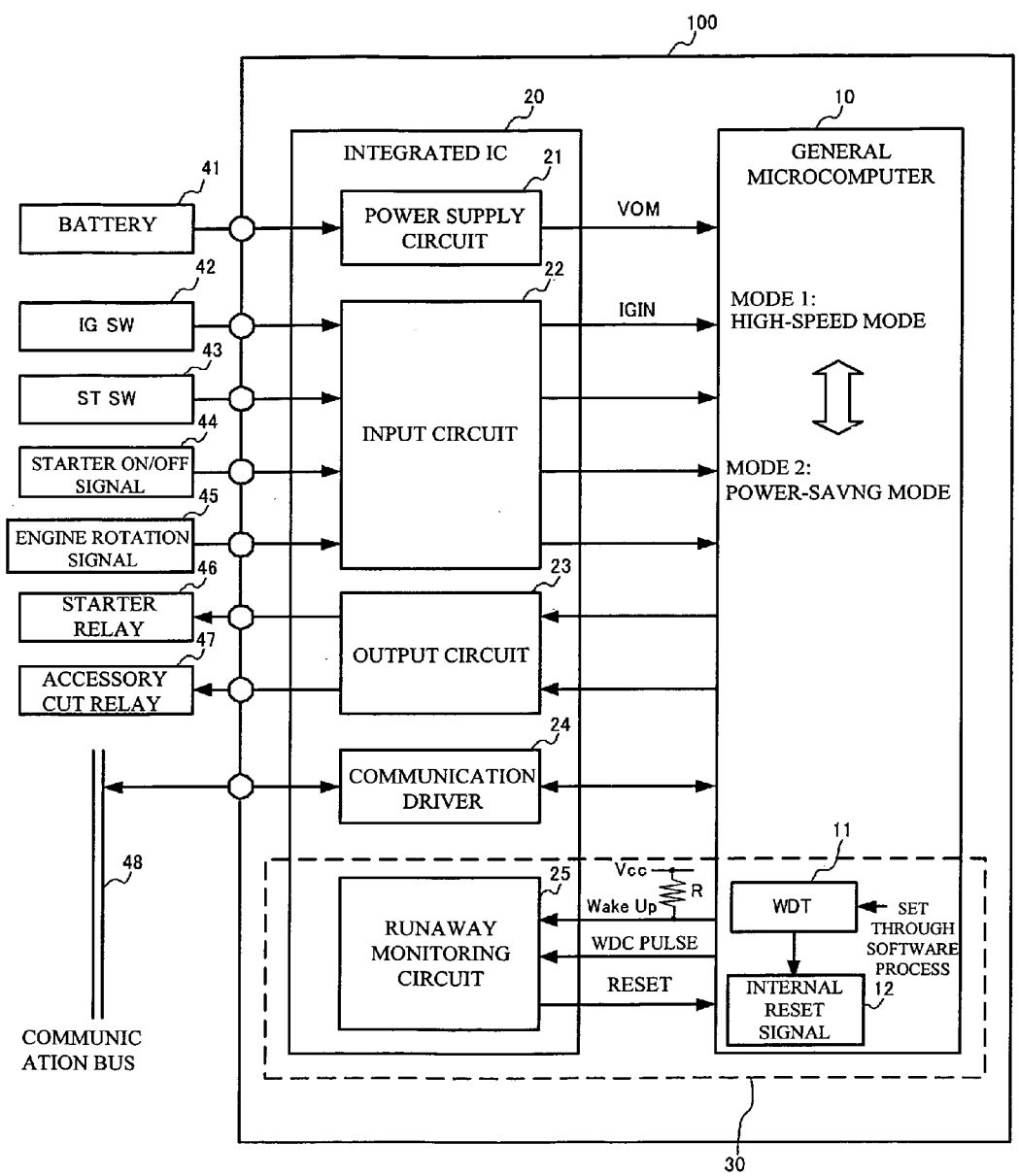
FIG. 1 is a block diagram showing the configuration of an electronic control device according to one embodiment of the present invention.

FIG. 1 is a block diagram showing an electronic control device installed in a vehicle according to one embodiment of the present invention. In FIG. 1, the electronic control device 100 installed in a vehicle includes a general microcomputer (hereinafter referred to simply as "microcomputer") 10 which is an example of an electronic device, and an interface device 20 which handles external signal exchanges of the microcomputer 10. The interface device 20 is an IC which handles various signals to be described later, for example. Hereinafter, the interface device 20 is called "integrated IC 20." The electronic control device 100 is connected with or may be fed with a battery 41, an ignition switch (IG SW) 42, a starter switch (ST SW) 43, a starter on/off signal 44, an engine rotation signal 45, a starter relay 46, an accessory cut relay 47, and a communication bus 48. The signals and components are examples. The electronic control device 100 may be connected with or fed with other components or signals.

The integrated IC 20 includes a power supply circuit 21, an input circuit 22, an output circuit 23, a communication driver 24, and a runaway monitoring circuit 25. The power supply circuit 21 steps down the output voltage of the battery 41, and outputs the resultant output voltage VOM to the general microcomputer 10. The input circuit 22 receives inputs of the ignition switch 42, the starter switch 43, the starter on/off signal 44, and the engine rotation signal 45, converts the signals so that they can be input to the microcomputer 10, and then outputs the resultant signals to the microcomputer 10. The output circuit 23 receives a control signal output from the microcomputer 10, generates a signal which drives the starter relay 46 and the accessory cut relay 47, and outputs the signal to the starter relay 46 and the accessory cut relay 47. When the starter relay 46 is driven, the starter on/off signal changes from the off-state level to the on-state level. The communication driver 24 performs a signal exchange between the microcomputer 10 and a device (not shown) connected with the communication bus 48. The runaway monitoring circuit 25 monitors the microcomputer 10 for an operational failure (runaway process). The runaway monitoring circuit 25 receives a wakeup signal and a watchdog timer counter (WDC) pulse, and outputs a reset signal INIT. The configuration and operation of the runaway monitoring circuit 25 are described later in detail.

The microcomputer 10 is an arithmetic device including a CPU, a RAM, a ROM, and the like as embedded components. In the example shown in FIG. 1, the microcomputer 10 is fed with an input from the battery 41, the ignition switch 42, the starter switch 43, the starter on/off signal 44, and the engine rotation signal 45 to perform control of the starter relay 46 and the accessory cut relay 47. The specific control sequence of the starter relay 46 and the accessory cut relay 47 is not essential to the present invention. Therefore, description thereof is omitted. The microcomputer 10 has several operational modes. For example, the microcomputer 10 has two operational states of a high-speed mode (activated state) and a power-saving mode (terminated state). The microcomputer 10 operates at high-speed clock in the high-speed mode, and operates at a clock speed lower than the high-speed clock or terminates the operation in the power-saving mode. The microcomputer 10 has a watchdog timer circuit (WDT) 11. The watchdog timer circuit 11 is reset through a software process of the CPU in the microcomputer 10, and generates an internal reset signal 12.

The runaway monitoring circuit 25 and the watchdog timer circuit 11 constitute the failure monitoring device 30. The runaway monitoring circuit 25 starts the operation when the power is supplied, and terminates the operation when the microcomputer 10 is in the power-saving mode. When the runaway monitoring circuit 25 of the failure monitoring device 30 detects a runaway process of the microcomputer 10 as described later, the runaway monitoring circuit 25 outputs the reset signal INIT to the microcomputer 10 and resets the microcomputer 10. When the watchdog timer circuit 11 detects a runaway process of the microcomputer 10 as described later, the watchdog timer circuit 11 generates the internal reset signal 12 and resets the microcomputer 10. If the microcomputer 10 is in the power-saving mode, the watchdog timer circuit 11 terminates the operation.

Figure 2A:
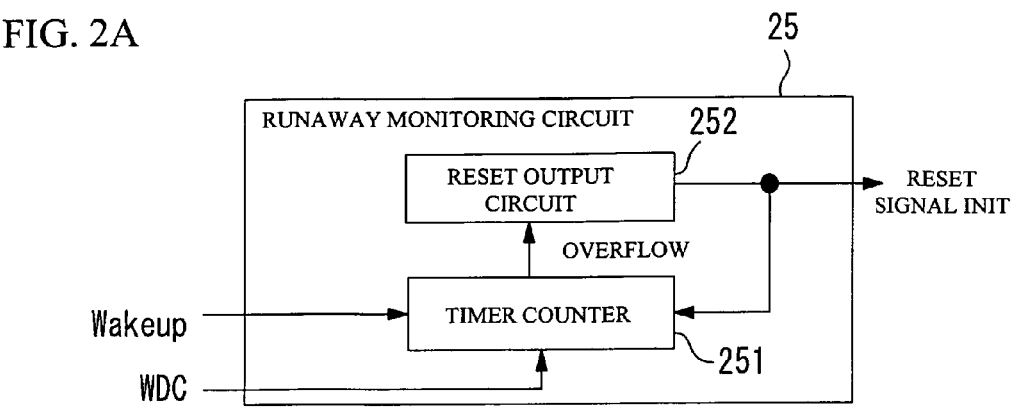
FIG. 2A shows an example of the configuration of the runaway monitoring circuit 25 shown in FIG. 1.
Figure 2B:
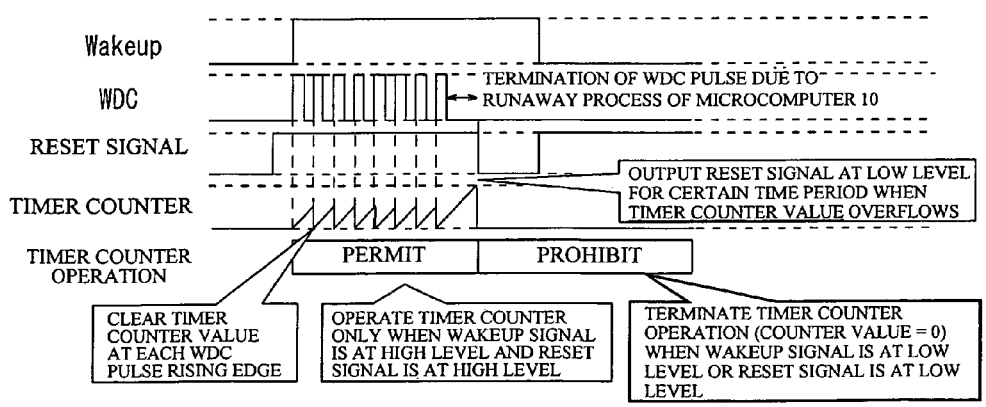
FIG. 2B is an operational timing chart of the runaway monitoring circuit 25.

FIG. 2A is a block diagram showing an example of the configuration the runaway monitoring circuit 25. FIG. 2B is an operational timing chart of the runaway monitoring circuit 25. The runaway monitoring circuit 25 has a timer counter 251 and a reset output circuit 252. The timer counter 251 is a timer which counts a specific value. When the reset signal INIT is at high level (off) and the wakeup signal which is an indication signal showing the operational state of the microcomputer 10 is at high level (on), the timer counter 251 performs a counting operation while synchronizing with the rising edge of the WDC pulse to clear the counter value. When the microcomputer 10 is in the high-speed mode (in normal operation), the microcomputer 10 outputs the WDC pulse at a certain frequency. When the microcomputer 10 is in the power-saving mode, the microcomputer 10 does not output the WDC pulse. When the WDC pulse is terminated due to a runaway process of the microcomputer 10, the counter value exceeds the specific value, causing the timer counter 251 to overflow. The timer counter 251 outputs an overflow signal to the reset output circuit 252. When the reset output circuit 252 receives the overflow signal, the reset output circuit 252 outputs the reset signal INIT at low level for a certain period of time to the microcomputer 10. When the wakeup signal is at low level (off) or the reset signal INIT is at low level (on), the timer counter 251 terminates the counting operation.

After the battery 41 is connected, the wakeup signal is set at Vcc (high level) by the function of the pull-up resistor R shown in FIG. 1. One end of the pull-up resistor R is connected to the power supply voltage Vcc which is output from the battery 41 (and may be stepped down), and the other end is connected to a line (hereinafter referred to as "wakeup signal line") which connects the microcomputer 10 and the runaway monitoring circuit 25. As described later, the microcomputer 10 can forcibly set the wakeup signal at high level or a low level by holding the wakeup signal line in a floating state or connecting the wakeup signal line to the ground.

Figure 3A:
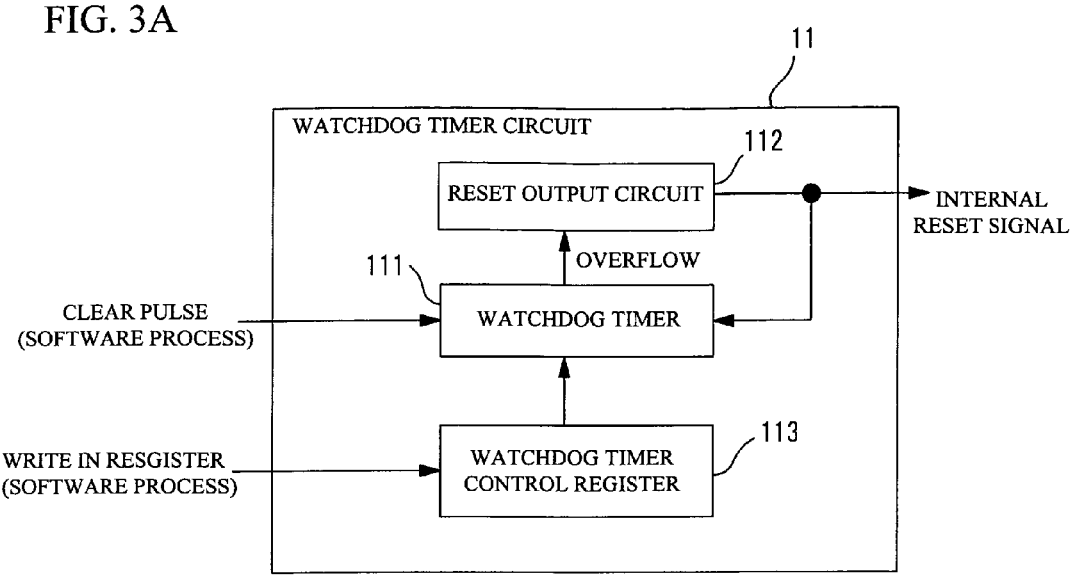
FIG. 3A shows an example of the configuration of the watchdog timer 11 shown in FIG. 1.
Figure 3B:
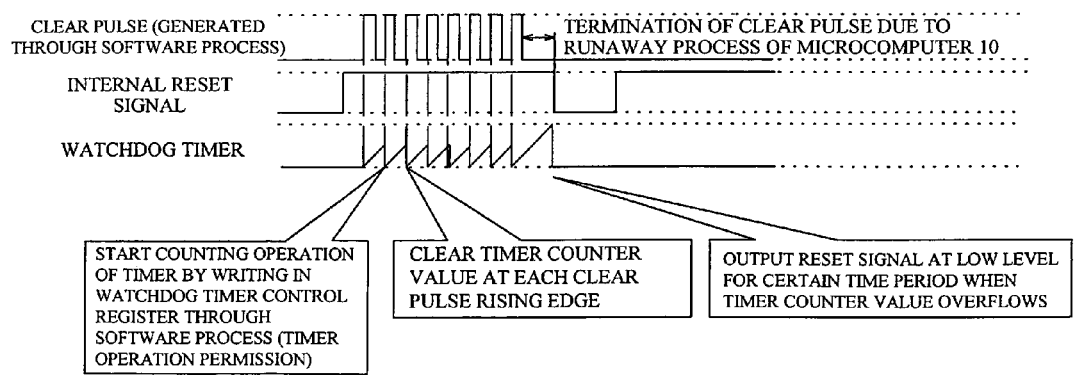
FIG. 3B is an operational timing chart of the watchdog timer 11.

FIG. 3A is a block diagram showing an example of the configuration the watchdog timer circuit 11. FIG. 3B is an operational timing chart of the watchdog timer circuit 11. The watchdog timer circuit 11 has a watchdog timer 111, a reset output circuit 112, and a watchdog timer control register 113. The watchdog timer 111 is a timer which counts a specific value. When a timer operation permission is written in the watchdog timer control register 113 through a software process, the watchdog timer 111 starts the counting operation and synchronizes with the rising edge of a clear pulse generated in the microcomputer 10 to clear the counter value. When the clear pulse is terminated due to a runaway process of the microcomputer 10, the counter value exceeds the specific value, causing the watchdog timer 111 to overflow. The watchdog timer 111 outputs an overflow signal to the reset output circuit 112. When the reset output circuit 112 receives the overflow signal, the reset output circuit 112 generates the internal reset signal 12 at low level for a certain period of time in the microcomputer 10.

Figure 4:
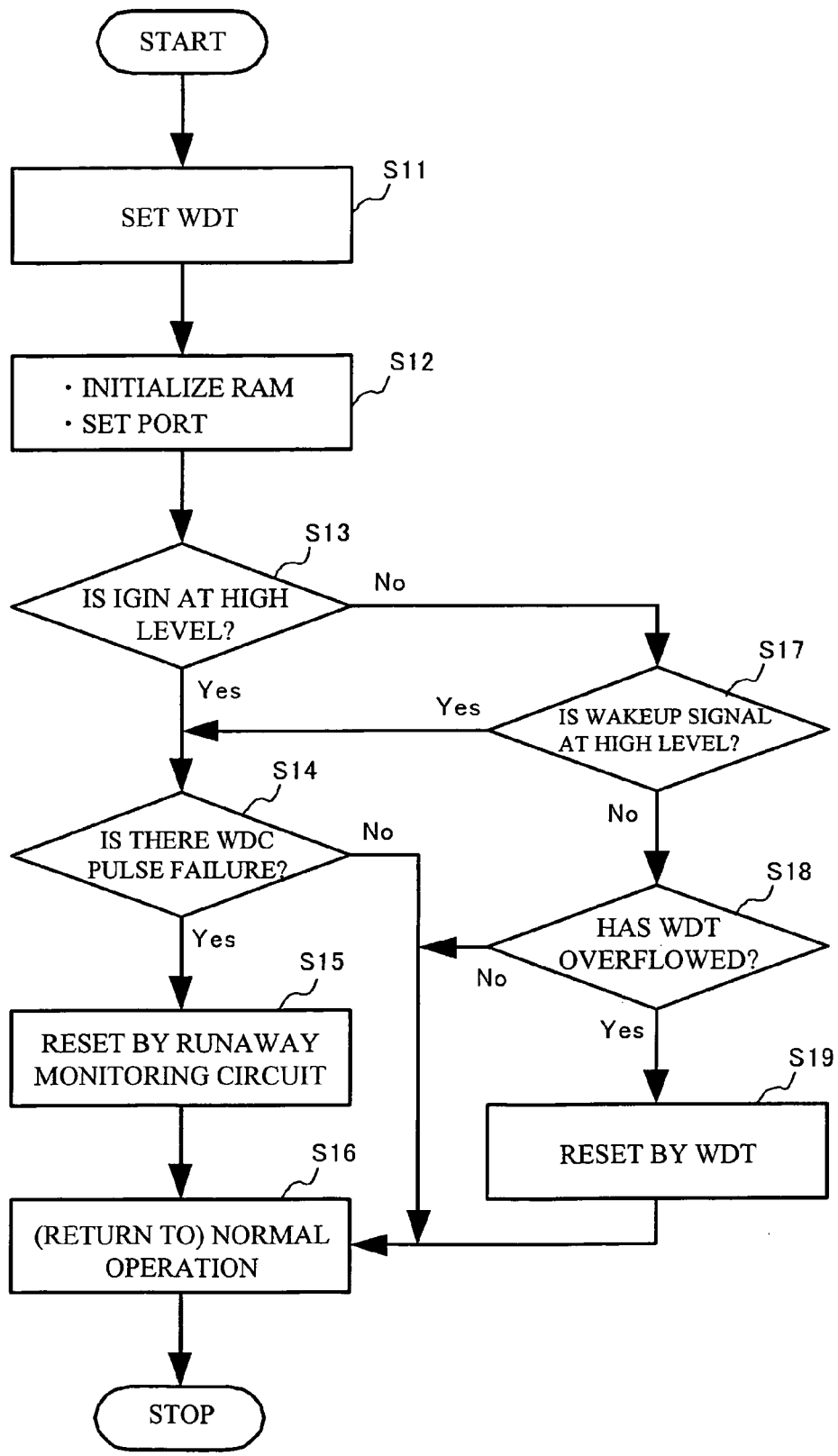
FIG. 4 is a flowchart showing the operation of the failure monitoring device 30 shown in FIG. 1.

FIG. 4 is a flowchart showing the operation of the failure monitoring device 30 shown in FIG. 1. In FIG. 4, steps S14 and S15 show operations of the runaway monitoring circuit 25, and the remaining steps S11 to S13 and S16 to S19 show operations of the microcomputer 10. In the initialization process of the step S11, the microcomputer 10 sets the watchdog timer circuit 11. Specifically, the CPU in the microcomputer 10 writes the timer operation permission in the watchdog timer control register 113 shown in FIG. 3A through a software process. Next, the microcomputer 10 performs the initial process of the step S12. Specifically, the CPU initializes the RAM in the microcomputer 10 and configures the setting of various ports. The various ports refer to the terminal portions of the electronic control device 100 to which the components 41 to 48 shown in FIG. 1 are connected, for example. Next, the microcomputer 10 checks whether the output signal IGIN of the ignition switch 42 is at high level or not (whether the ignition switch 42 is on or not) in the step S13. In the case where the determination result in the step S13 is YES, i.e., the ignition switch 42 is on, operations for the runaway monitoring circuit 25 including the steps S14 and S15 are selected. If the determination result is NO, i.e., the ignition switch 42 is off, operations for the watchdog timer circuit 11 including the steps S17 to S19 are selected.

When the ignition switch 42 is on, the wakeup signal is at high level unless the microcomputer 10 is in a runaway process. In the step S14, the runaway monitoring circuit 25 monitors the WDC pulses for failures. If there is a failure, the runaway monitoring circuit 25 outputs the reset signal INIT for a certain period of time as described above with reference to FIGS. 2A and 2B in the step S15. The microcomputer 10 is reset in response to the reset signal INIT, whereby the microcomputer 10 returns to normal operation in the step S16. In the case where the determination result in the step S14 is NO, the microcomputer 10 operates normally (step S16).

In the case where the ignition switch 42 is off, the microcomputer 10 checks whether the wakeup signal is at high level (on) or not in the step S17. In the case where the determination result in the step S17 is YES, the operation proceeds to the step S14. In the case where the determination result in the step S17 is NO, the microcomputer 10 determines whether the counter value of the watchdog timer 111 (see FIG. 3A) of the watchdog timer circuit 11 has overflowed or not in the step S18. In the case where the determination result in the step S18 is NO, the microcomputer 10 operates normally (step S16). If the determination result is YES, the watchdog timer circuit 11 of the microcomputer 10 outputs the internal reset signal 12 in the step S19. The microcomputer 10 is reset in response to the internal reset signal, whereby the microcomputer 10 returns to normal operation in the step S16.

Next, a specific example of the operation of the failure monitoring device 30 is described. In the specific example below, the microcomputer 10 is required to be in the power-saving mode before the ignition switch 42 is turned on and after the ignition switch 42 is turned off.

Figure 5:
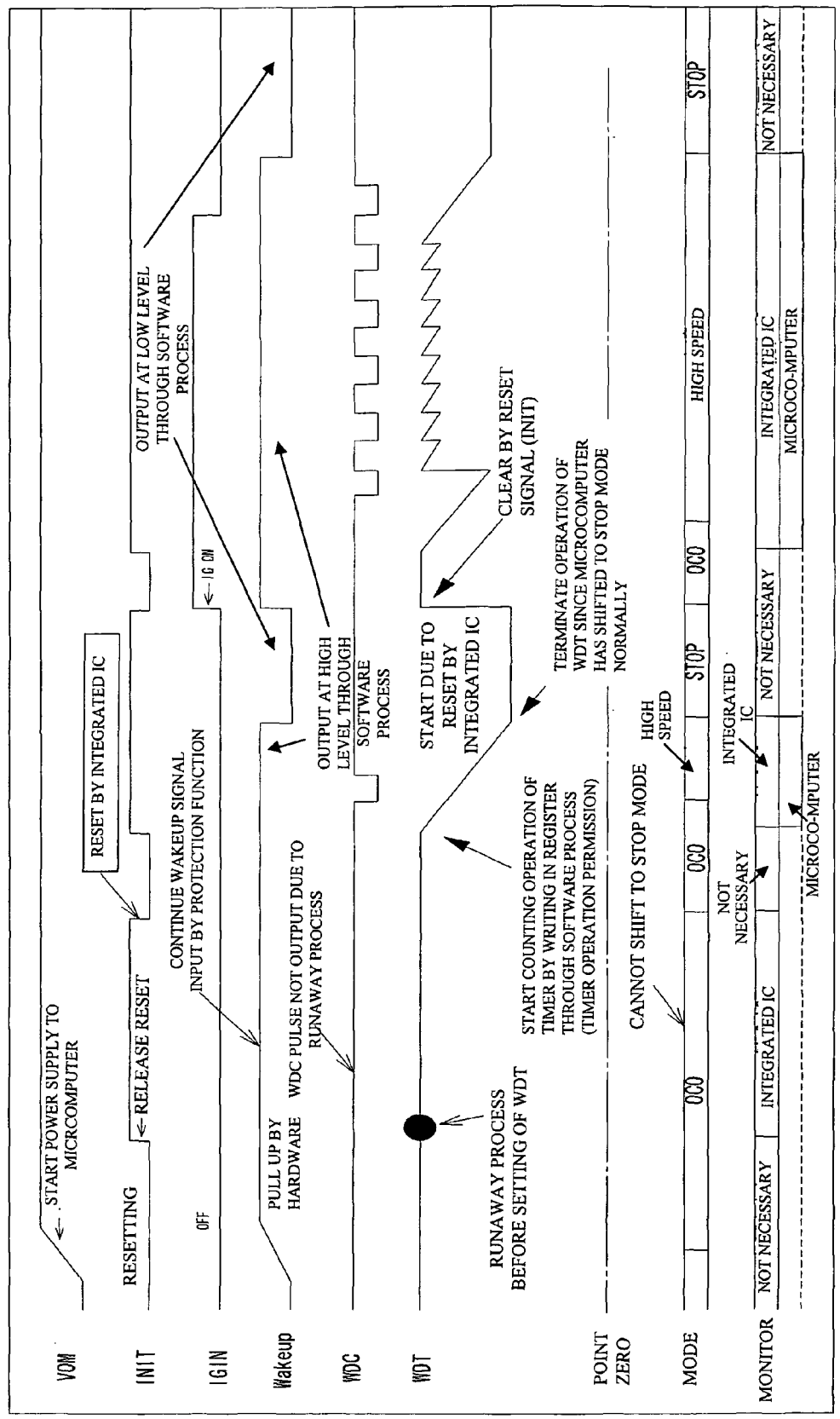
FIG. 5 is a timing chart showing a first operational example of the failure monitoring device 30.

FIG. 5 is a timing chart showing a case of a runaway process of the microcomputer 10 immediately after the power-on reset of the reset signal INIT has been released and before initialization of the watchdog timer circuit 11 is performed in the step S11 shown in FIG. 4, when the battery 41 shown in FIG. 1 is connected to the electronic control device 100. When the battery 41 is connected to the electronic control device 100, the wakeup signal generated by the pull-up resistor R pulled up to the power supply voltage Vcc rises to the voltage Vcc (the wakeup signal is pulled up by a hardware). The reset output circuit 252 shown in FIG. 2A exhibits the power-on reset function in cases other than the overflow of the timer counter 251. That is, the reset signal INIT is held at low level for a certain period of time after the rise of the battery voltage VOM, and then rises to high level (releases the reset), as shown in FIG. 5. Since the runaway process of the microcomputer 10 has occurred at a timing shown by the black circle in FIG. 5, the microcomputer 10 does not generate the WDC pulse. Therefore, the timer counter 251 shown in FIG. 2A overflows. The reset output circuit 252 causes the reset signal INIT to fall from high level to low level, and holds the reset signal INIT at the low level for a certain period of time. Since the microcomputer 10 is reset by the integrated IC 20 in this manner, the microcomputer 10 can reliably be reset in the case of a runaway process of the microcomputer 10 immediately after the power-on reset of the reset signal INIT has been released and before setting of the watchdog timer circuit 11 is performed in the step S11 shown in FIG. 4, when the battery 41 is connected to the electronic control device 100.

The control described above is executed by the steps S13, S17, S14, S15 and S16 in the sequence shown in FIG. 4.

When the microcomputer 10 is reset as described above, the microcomputer 10 returns to normal operation and generates the WDC pulse. After generating a single WDC pulse, the microcomputer 10 in normal operation detects that the ignition switch signal IGIN is in the off-state, sets the wakeup signal line shown in FIG. 1 at low level, and shifts to the power-saving mode (referred to as "STOP mode" in FIG. 5) in the example shown in FIG. 5. The ignition switch signal IGIN is then turned on. At this timing, the reset output circuit 252 turns on the reset signal INIT (sets the reset signal INIT at low level) for a specific period of time. At the above timing, the watchdog timer circuit 11 starts the counting operation, and is reset each time the WDC pulse is generated. In the timing charts shown in FIGS. 5 to 16, the watchdog timer 111 decrements the specific counter value, and overflows when the counter value exceeds zero.

Note that in FIG. 5, the term "OCO" in the mode section of the microcomputer stands for "on-chip oscillator," and indicates a period in which an oscillator (not shown) provided in the microcomputer 10 operates to generate a clock during a reset period.

Figure 6:
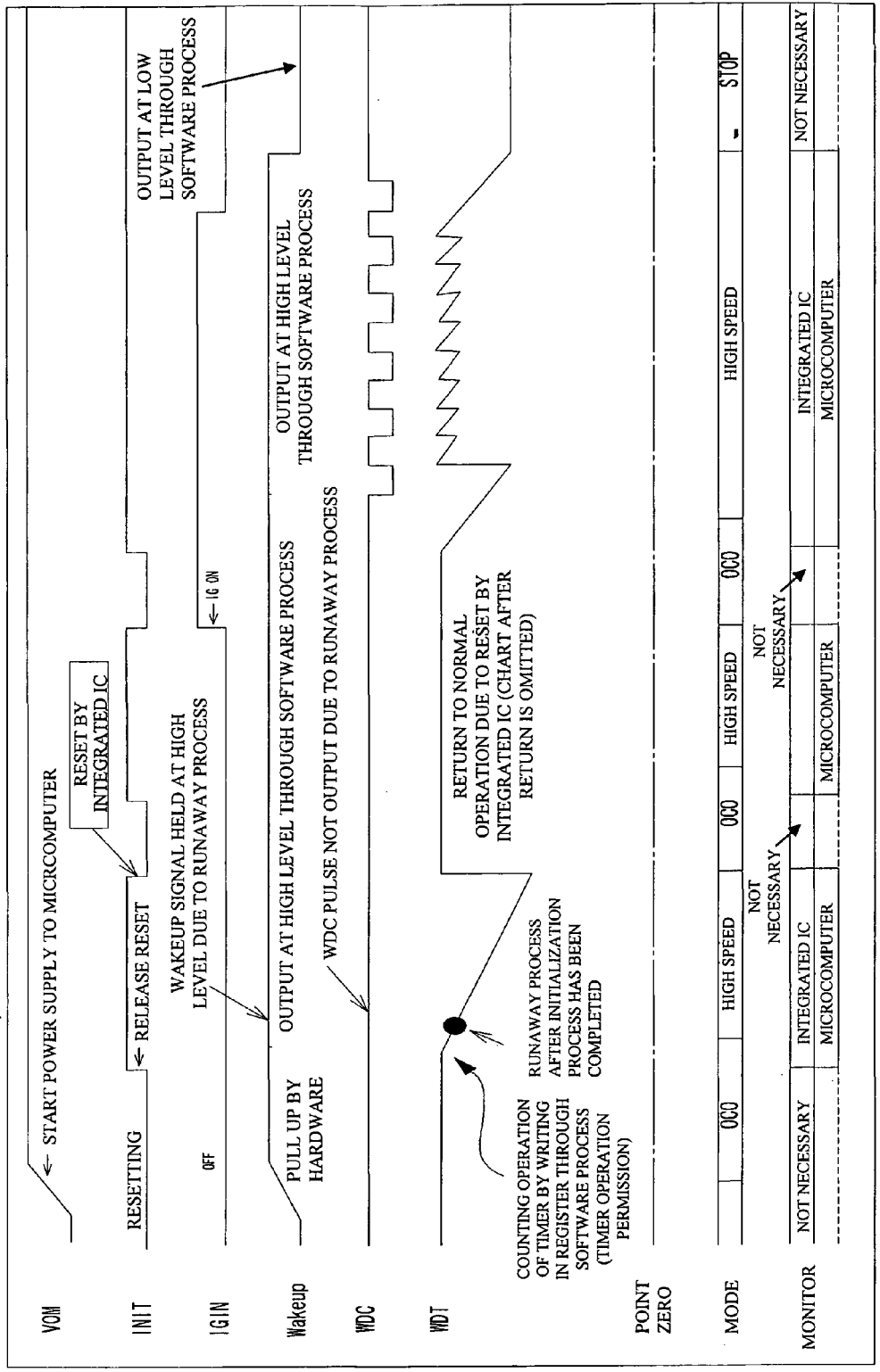
FIG. 6 is a timing chart showing a second operational example of the failure monitoring device 30.

FIG. 6 is a timing chart showing a case of a runaway process of the microcomputer 10 after the power-on reset process has been completed (after the watchdog timer circuit 11 has been set) whereby the microcomputer 10 in the runway process holds the wakeup signal at high level through a software process, when the battery 41 is connected to the electronic control device 100. After the reset by the reset signal INIT has been released, the watchdog timer circuit 11 starts the counting operation. In the case of a runaway process of the microcomputer 10 thereafter, the WDC pulse is not generated. Thus, the runaway monitoring circuit 25 sets the reset signal INIT at low level and resets the microcomputer 10. In this manner, the microcomputer 10 can reliably be reset by the function of the runaway monitoring circuit 25 in the case of a runaway process as shown in FIG. 6.

The control described above is executed by the steps S13, S17, S14, S15, and S16 in the sequence shown in FIG. 4.

Figure 7:
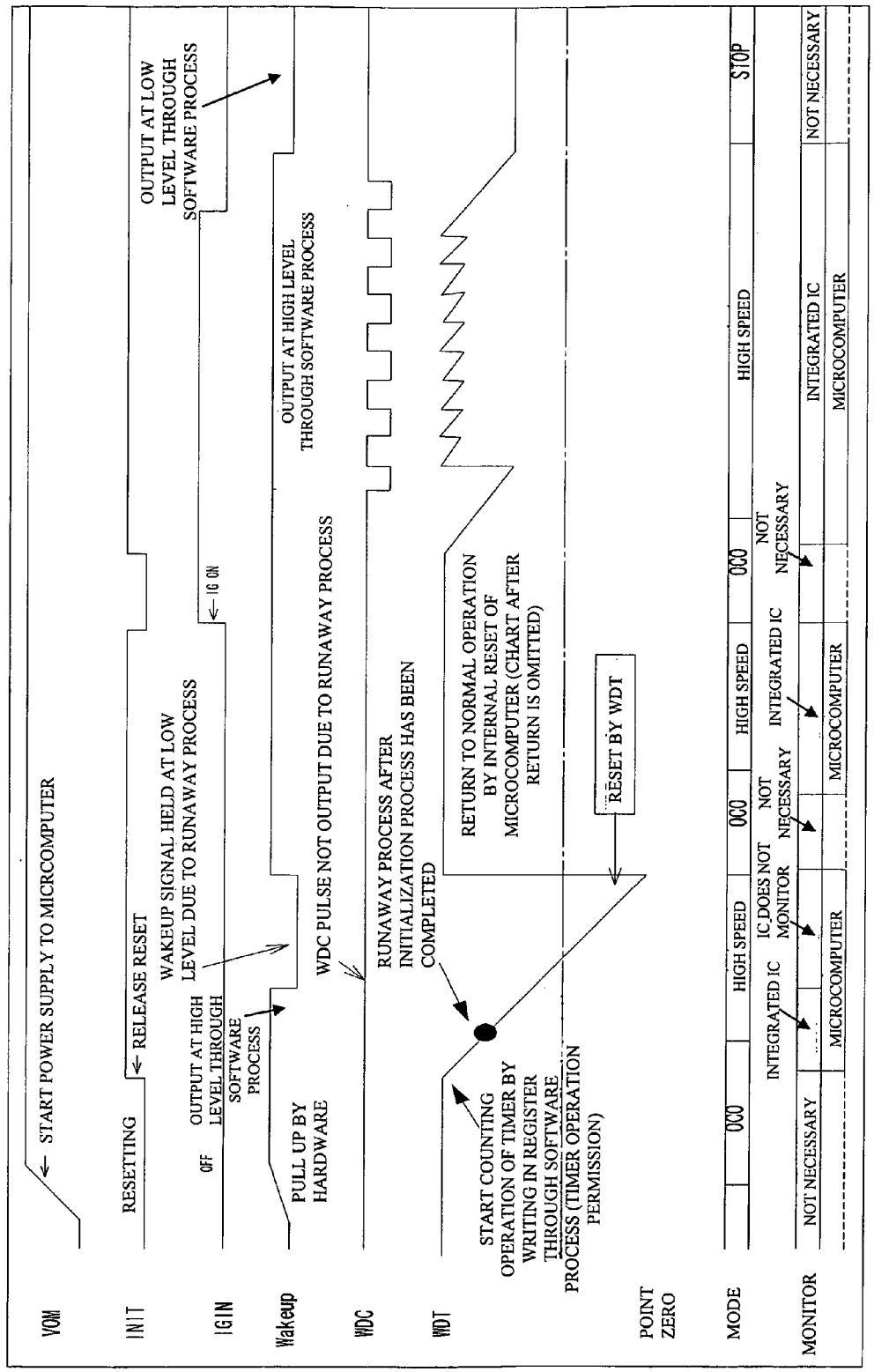
FIG. 7 is a timing chart showing a third operational example of the failure monitoring device 30.

FIG. 7 is a timing chart showing a case of a runaway process of the microcomputer 10 after the power-on reset process has been completed (after the watchdog timer circuit 11 has been set) whereby the microcomputer 10 in the runaway process holds the wakeup signal at low level through a software process, when the battery 41 is connected to the electronic control device 100. Due to the runaway process, the operation of the runaway monitoring circuit 25 is terminated while the wakeup signal is held at low level. In addition, the WDC signal is not generated. Since the clear pulse shown in FIG. 3 is not generated, the watchdog timer circuit 11 is not reset and decrements the counter value. The watchdog timer circuit 11 then overflows and outputs the internal reset signal 12. The microcomputer 10 is thus reset. In this manner, the microcomputer 10 can reliably be reset by the watchdog timer function of the microcomputer 10 in the case of a runaway process as shown in FIG. 7.

The control described above is executed by the steps S13, S17, S18, S19 and S16 in the sequence shown in FIG. 4.

When the microcomputer 10 is in the power-saving (STOP) mode, defined as the state in which the wakeup signal is set at low level, the watchdog timer circuit 11 terminates the counting operation, whereby the counter value immediately before the last mode shift is held. On the other hand, in the case where the wakeup signal is set at low level due to a runaway process of the microcomputer 10, the watchdog timer circuit 11 does not terminate the counting operation and thereby overflows. Thus, whether or not the microcomputer 10 has shifted to the power-saving mode can reliably be detected based on whether or not the watchdog timer circuit 11 has performed a reset operation.

Figure 8:
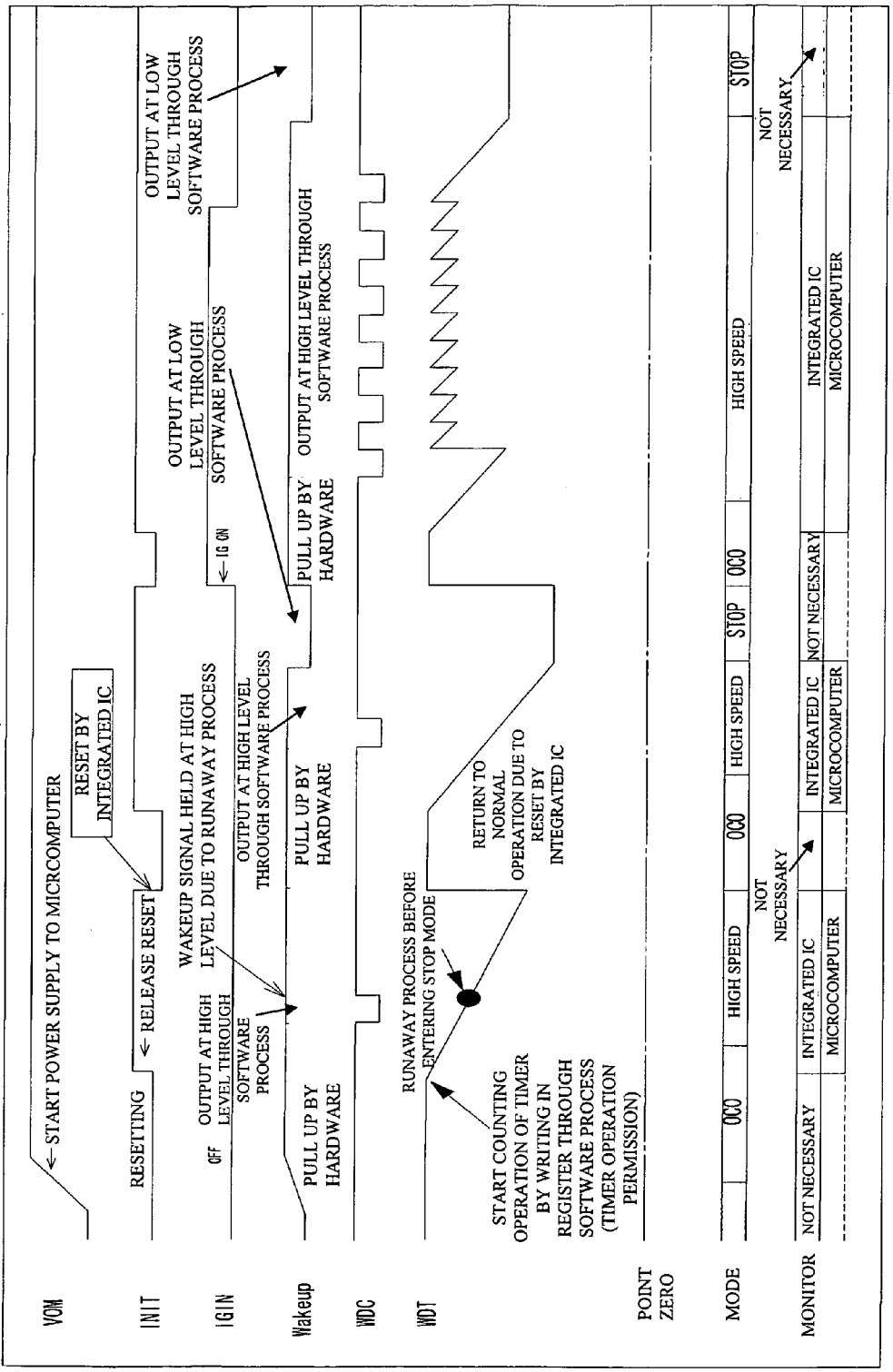
FIG. 8 is a timing chart showing a fourth operational example of the failure monitoring device 30.

FIG. 8 is a timing chart showing a case where the wakeup signal is held at high level due to a runaway process of the microcomputer 10 whereby the microcomputer 10 is prevented from shifting to the power-saving mode, when the battery 41 is connected to the electronic control device 100. In the same manner as the operation shown in FIG. 6 described above, the runaway monitoring circuit 25 outputs the reset signal INIT to the microcomputer 10. Accordingly, the microcomputer 10 can return to normal operation, and then can shift to the power-saving (STOP) mode by setting the wakeup signal line to low level.

The control described above is executed by the steps S13, S17, S14, S15, and S16 in the sequence shown in FIG. 4.

Figure 9:
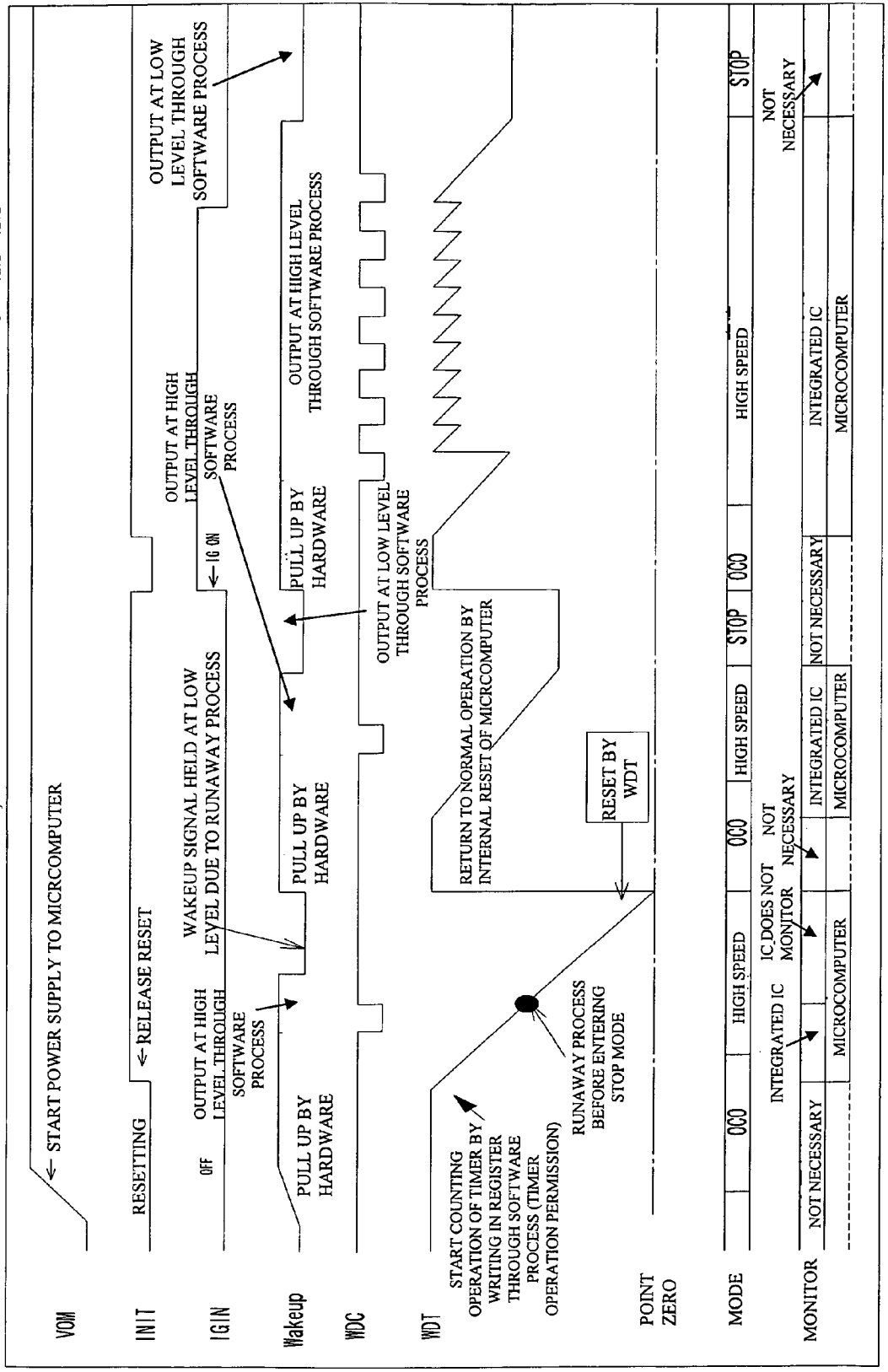
FIG. 9 is a timing chart showing a fifth operational example of the failure monitoring device 30.

FIG. 9 is a timing chart showing a case where the wakeup signal is held at low level due to a runaway process of the microcomputer 10 whereby the microcomputer 10 is prevented from shifting to the power-saving mode, when the battery 41 is connected to the electronic control device 100. In the same manner as the operation shown in FIG. 7 described above, the watchdog timer circuit 11 generates the internal reset signal 12. Accordingly, the microcomputer 10 can return to normal operation, and then can shift to the power-saving (STOP) mode by setting the wakeup signal line to low level.

The control described above is executed by the steps S13, S17, S18, S19, and S16 in the sequence shown in FIG. 4.

Figure 10:
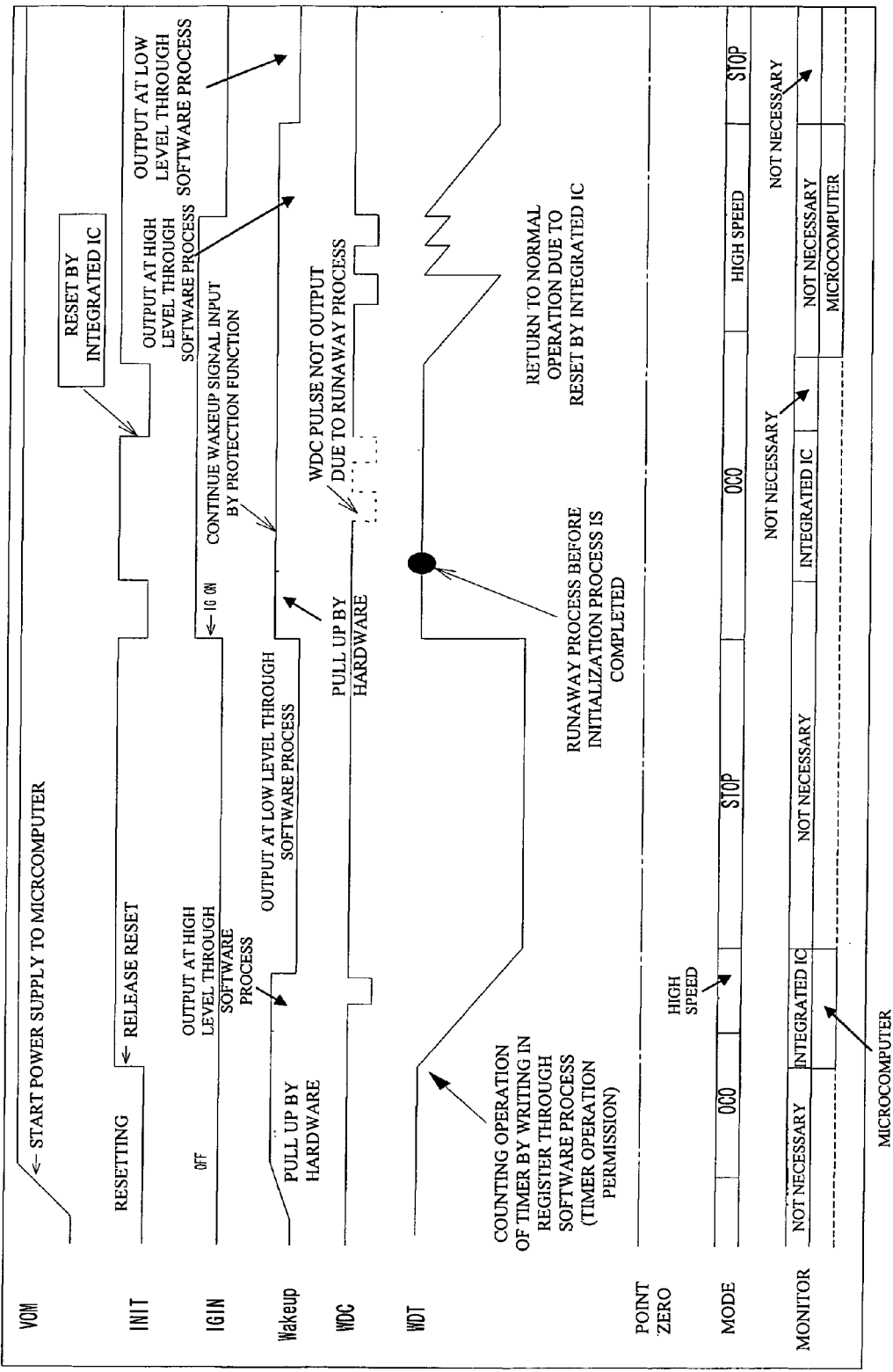
FIG. 10 is a timing chart showing a sixth operational example of the failure monitoring device 30.

FIG. 10 is a timing chart showing a case of a runaway process of the microcomputer 10 before the initialization process is completed (before the setting of the watchdog timer circuit 11 is completed) after the ignition switch 42 is turned on. In the case of a runaway process of the microcomputer 10 after the microcomputer 10 has been reset by the reset signal INIT falling to low level after the ignition switch signal IGIN is turned on, the watchdog timer circuit 11 does not perform the counting operation and does not output the WDC signal. Since the pull-up resistor R generates the wakeup signal, the wakeup signal is held at high level. Therefore, the operation of the runaway monitoring circuit 25 is secured. The runaway monitoring circuit 25 outputs the reset signal INIT to the microcomputer 10, whereby the microcomputer 10 is reset. In this manner, the microcomputer 10 can reliably be reset by the function of the runaway monitoring circuit 25 in the case of a runaway process as shown in FIG. 10.

The control described above is executed by the steps S13, S17, S14, S15, and S16 in the sequence shown in FIG. 4.

Figure 11:
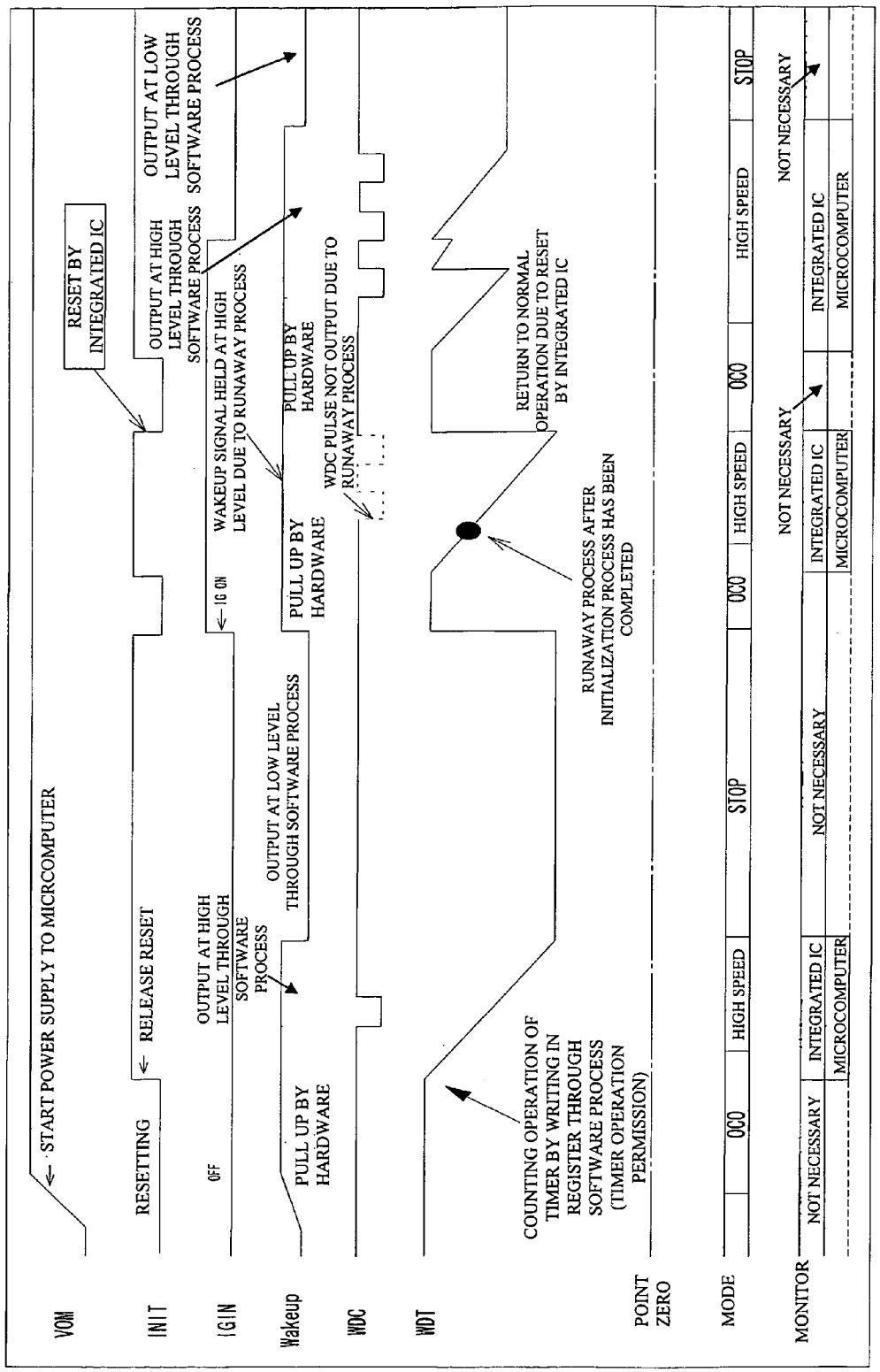
FIG. 11 is a timing chart showing a seventh operational example of the failure monitoring device 30.

FIG. 11 is a timing chart showing a case of a runaway process of the microcomputer 10 after the initialization process has been completed whereby the wakeup signal is held at high level after the ignition switch 42 is turned on. Since the initialization process is completed, the watchdog timer circuit 11 starts the counting operation. Since the WDC signal is not generated due to the runaway process of the microcomputer 10, the watchdog timer circuit 11 is not reset. However, since the wakeup signal is at high level, the runaway monitoring circuit 25 is operated. At the point when the timer counter 251 overflows, the reset signal INIT becomes low level and the microcomputer 10 is reset. In this manner, the microcomputer 10 can reliably be reset by the function of the runaway monitoring circuit 25 in the case of a runaway process as shown in FIG. 11.

The control described above is executed by the steps S13, S17, S14, S15, and S16 in the sequence shown in FIG. 4.

Figure 12:
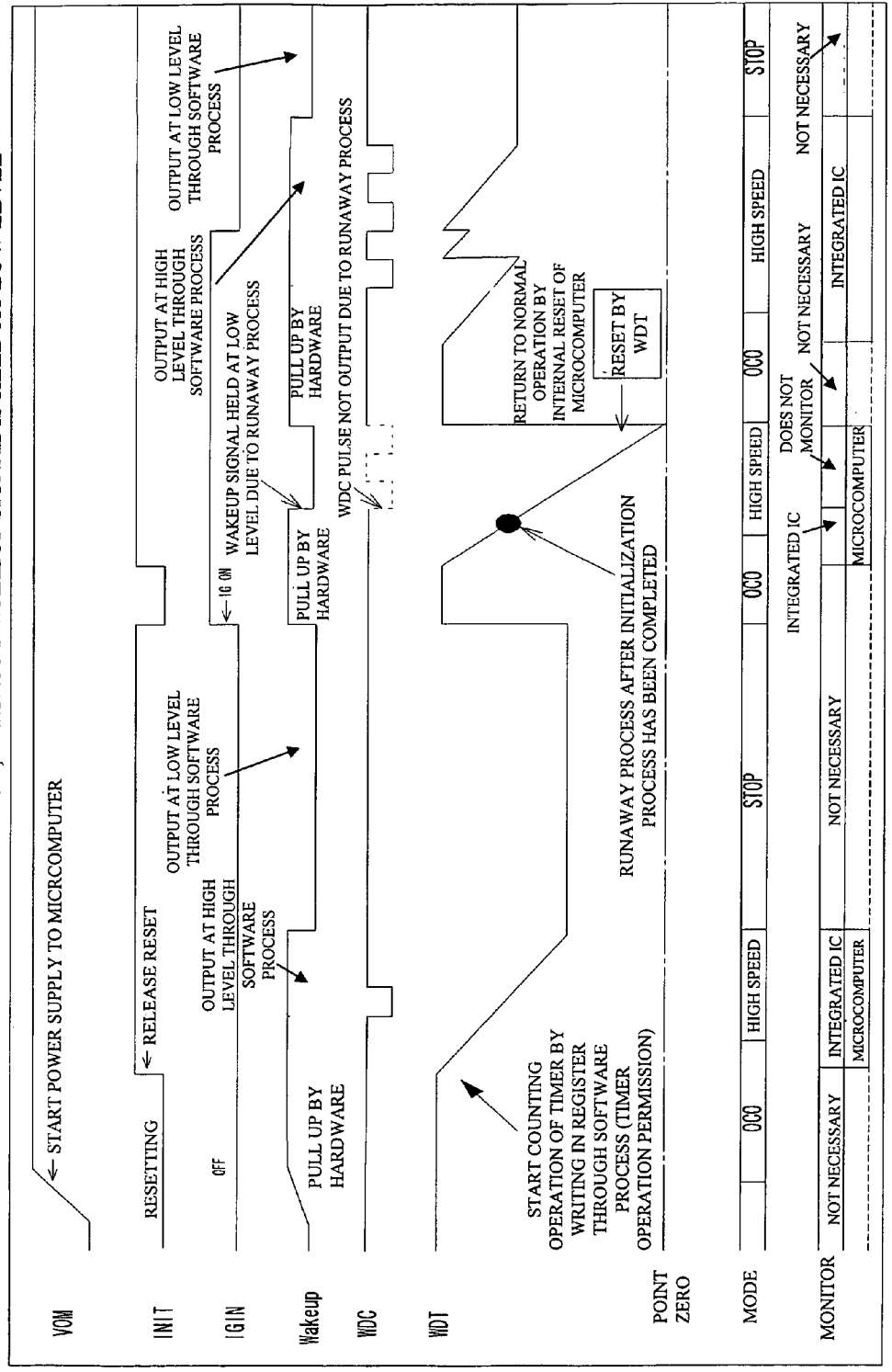
FIG. 12 is a timing chart showing an eighth operational example of the failure monitoring device 30.

FIG. 12 is a timing chart showing a case of a runaway process of the microcomputer 10 after the initialization process has been completed whereby the wakeup signal is held at low level after the ignition switch 42 is turned on. Since the initialization process is completed, the watchdog timer circuit 11 starts the counting operation. Since the WDC signal is not generated due to the runaway process of the microcomputer 10, the watchdog timer circuit 11 is not reset. Meanwhile, the operation of the runaway monitoring circuit 25 is terminated since the wakeup signal is at low level. The watchdog timer 111 then overflows, and the internal reset signal 12 is generated. In this manner, the microcomputer 10 can reliably be reset by the function of the watchdog timer circuit 11 in the case of a runaway process as shown in FIG. 11.

The control described above is executed by the steps S13, S17, S18, S19 and S16 in the sequence shown in FIG. 4.

Figure 13:
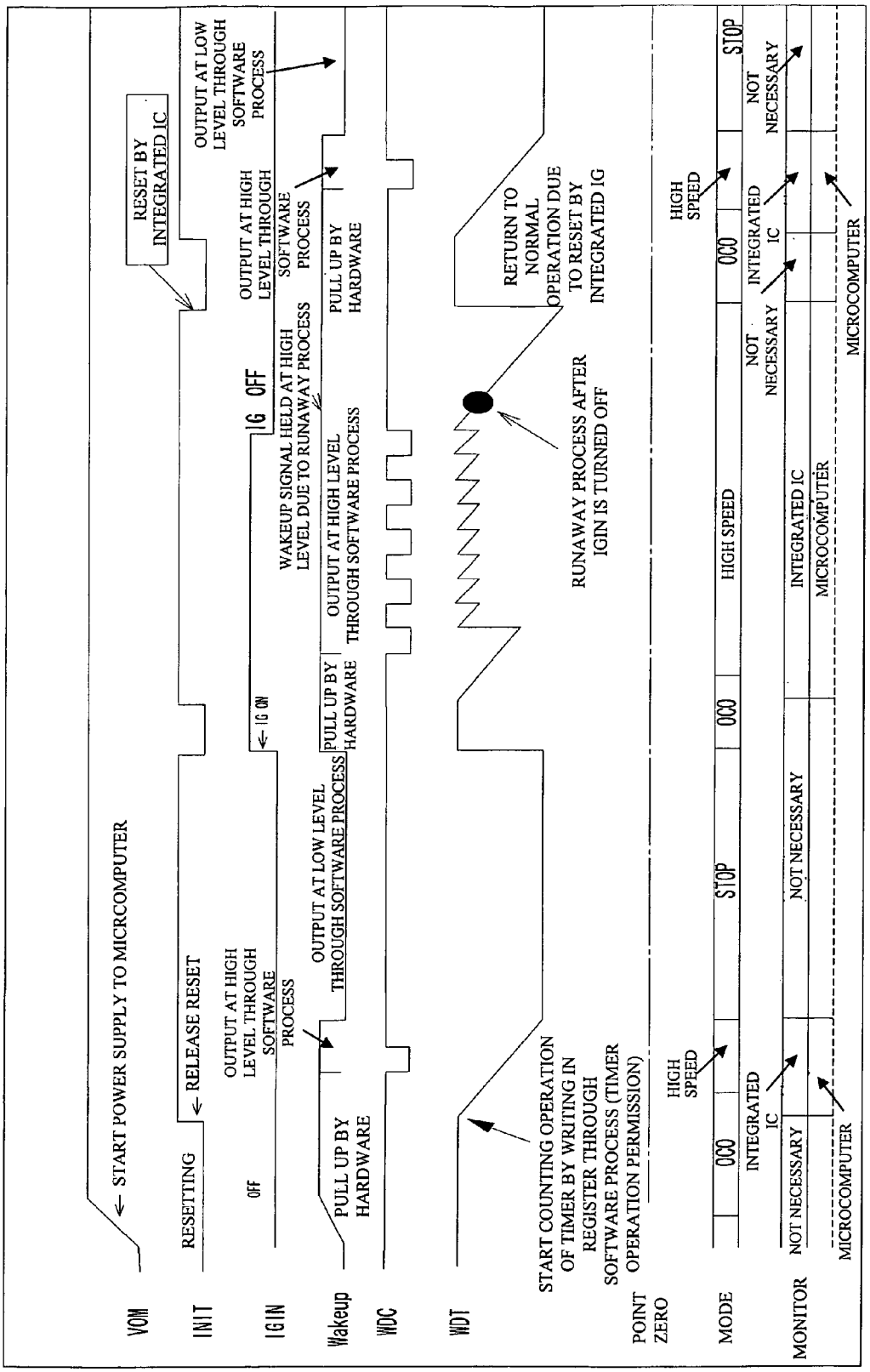
FIG. 13 is a timing chart showing a ninth operational example of the failure monitoring device 30.

FIG. 13 is a timing chart showing a case of a runaway process of the microcomputer 10 whereby the wakeup signal is held at high level after the ignition switch 42 is turned off. The output of the WDC pulse is terminated due to the runaway process of the microcomputer 10. Since the wakeup signal is held at high level by the pull-up resistor R, the runaway monitoring circuit 25 is operated. The termination of the WDC pulse causes the timer counter 251 to overflow, whereby the runaway monitoring circuit 25 outputs the reset signal INIT to the microcomputer 10. The microcomputer 10 is thus reset. In this manner, the microcomputer 10 can reliably be reset by the function of the runaway monitoring circuit 25 in the case of a runaway process as shown in FIG. 13.

The control described above is executed by the steps S13, S17, S14, S15, and S16 in the sequence shown in FIG. 4.

FIG. 14 is a timing chart showing a case of a runaway process of the microcomputer 10 whereby the wakeup signal is held at low level after the ignition switch 42 is turned off. The output of the WDC pulse is terminated due to the runaway process of the microcomputer 10. The operation of the runaway monitoring circuit 25 is terminated since the wakeup signal is held at low level due to the runaway process. The watchdog timer circuit 11 then overflows due to the termination of the WDC pulse, and outputs the internal reset signal 12. The microcomputer 10 is thus reset. In this manner, the microcomputer 10 can reliably be reset by the function of the watchdog timer circuit 11 in the case of a runaway process as shown in FIG. 14.

The control described above is executed by the steps S13, S17, S18, S19 and S16 in the sequence shown in FIG. 4.

FIG. 15 is a timing chart showing a case where the wakeup signal is held at high level due to a runaway process of the microcomputer 10 after the ignition switch 42 is turned off, whereby the microcomputer 10 is prevented from shifting to the power-saving mode. Since the wakeup signal is held at high level, the runaway monitoring circuit 25 is operated and outputs the reset signal INIT to the microcomputer 10. Accordingly, the microcomputer 10 can return to normal operation, and then can shift to the power-saving (STOP) mode by setting the wakeup signal line to low level.

The control described above is executed by the steps S13, S17, S14, S15, and S16 in the sequence shown in FIG. 4.

FIG. 16 is a timing chart showing a case where the wakeup signal is held at low level due to a runaway process of the microcomputer 10 after the ignition switch 42 is turned off, whereby the microcomputer 10 is prevented from shifting to the power-saving mode. Since the wakeup signal is held at low level, the runaway monitoring circuit 25 is not operated. The watchdog timer circuit 11 then overflows due to the termination of the WDC pulse, and outputs the internal reset signal 12. The microcomputer 10 is thus reset. In this manner, the microcomputer 10 can reliably be reset by the function of the watchdog timer circuit 11 in the case of a runaway process as shown in FIG. 16.

The control described above is executed by the steps S13, S17, S18, S19 and S16 in the sequence shown in FIG. 4.

With the configurations of the electronic control device according to the embodiments of the present invention, failures can be monitored by one monitoring section provided external to the microcomputer and a circuit in the microcomputer, whereby the device can achieve reduction of size and low cost.

By the above configurations, whether the microcomputer has shifted to the power-saving mode in a normal manner can be monitored reliably. Accordingly, the microcomputer can be monitored with low dark current, and the battery can be prevented from dying by reducing the dark current in a vehicle.

While the embodiments of the present invention have been described, it should be understood that the present invention is not limited to the above embodiments.

The present application is based on Japanese Patent Application No. 2006-341980 filed on Dec. 19, 2006, the entire disclosure of which is hereby incorporated by reference.

What is claimed is:

1. An electronic control device comprising:
   an arithmetic device that is a microprocessor having a watchdog timer circuit built in the microprocessor; and
   a runaway monitoring circuit that is an integrated IC externally connected to the microprocessor and that monitors the arithmetic device for an operational failure by receiving a pulse output from the arithmetic device;
   wherein the watchdog timer circuit or the runaway monitoring circuit detects occurrence of a failure of the arithmetic device according to a state of an indication signal which shows an operational state of the arithmetic device,
   when a runaway of the arithmetic device takes place after the arithmetic device is connected to a power supply and before a predetermined timer value is set in the watchdog timer circuit, the runaway monitoring circuit detects the runaway of the arithmetic device and resets the arithmetic device,
   the indication signal includes a wakeup signal which is sent from the arithmetic device to the runaway monitoring circuit, and a clear pulse signal which is sent from the arithmetic device to the watchdog timer circuit, and
   when a runaway of the arithmetic device causes the wakeup signal to be held at a low level and causes the clear pulse signal not to be output from the arithmetic device, operation of the runaway monitoring circuit is terminated while the wakeup signal is held at the low level, and the watchdog timer circuit counts a time while the clear pulse signal is not output and resets the arithmetic device when the counted time exceeds a predetermined time.

2. The electronic control device according to claim 1, wherein the operational state of the arithmetic device is generated by the arithmetic device, and includes an activated state and a terminated state of the arithmetic device.

3. The electronic control device according to claim 1, further comprising:
   a circuit which sets a signal line for outputting the indication signal from the arithmetic device at a specific electric potential showing an activated state of the arithmetic device after the power supply is connected;
   wherein the runaway monitoring circuit monitors the arithmetic device for a runaway process when the signal line is at the specific electric potential.

4. The electronic control device according to claim 1, wherein the arithmetic device periodically outputs the pulse in an activated state and terminates output of the pulse in a terminated state.

5. The electronic control device according to claim 1, wherein the runaway monitoring circuit comprises a timer counter which starts a counting operation each time the timer counter receives the pulse, and a reset output circuit which outputs a reset signal to the arithmetic device when the timer counter is in a specific state.

6. The electronic control device according to claim 1, further comprising:
   a signal processing section which performs an external signal exchange;
   wherein the runaway monitoring circuit is provided in the signal processing section.

* * * * *